United States Patent Office 2,847,983
Patented Aug. 19, 1958

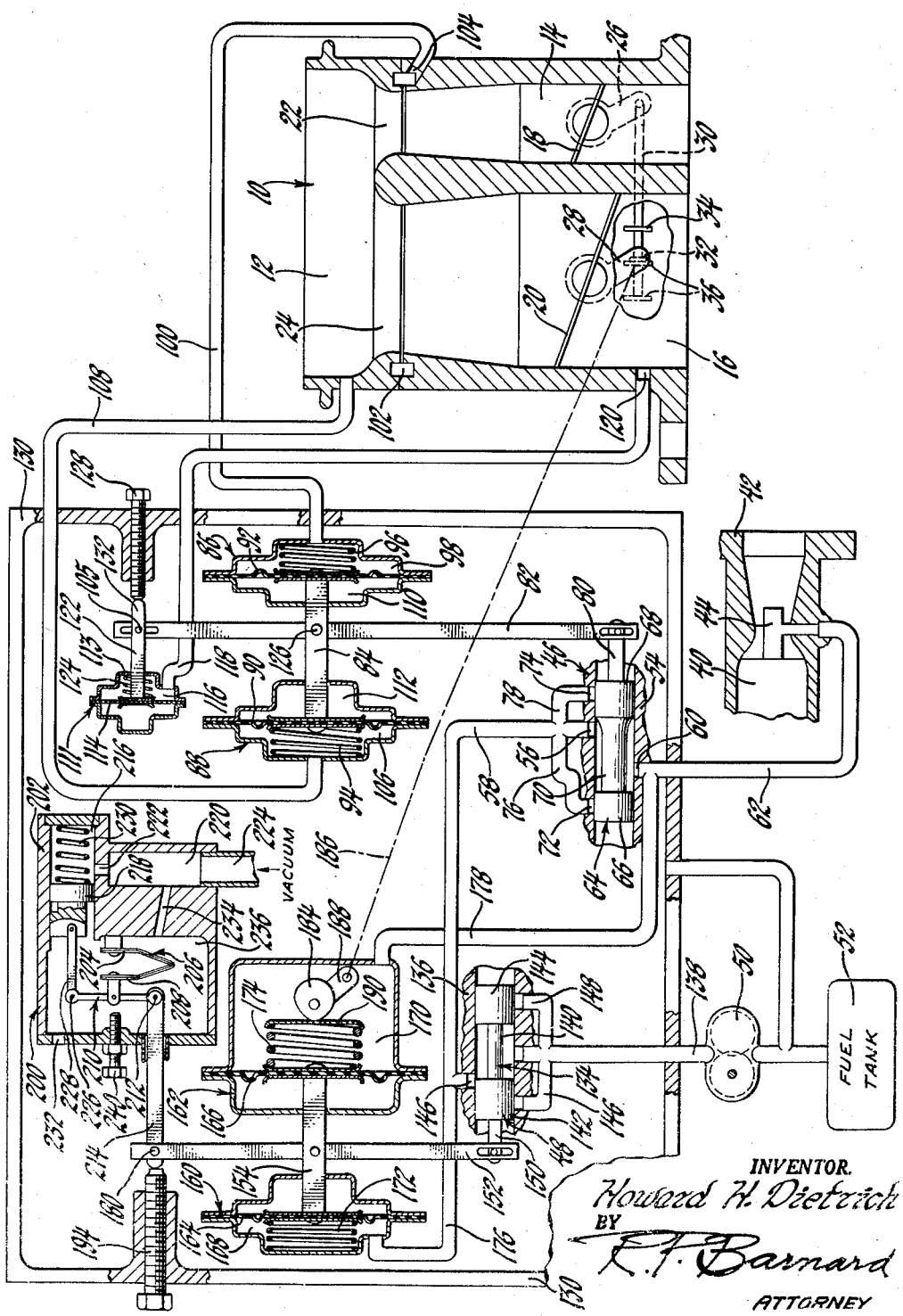

2,847,983

FUEL INJECTION SYSTEM

Howard H. Dietrich, Rochester, N. Y., assignor to General Motors Corporation, Detroit, Mich., a corporation of Delaware Application March 15, 1957, Serial No. 646,240

15 Claims. (Cl. 123—119)

The present invention relates to a fuel metering system of the type in which fuel is individually supplied to the cylinders of an internal combustion engine and otherwise generally termed as a fuel injection system.

In the fuel injection field there are broadly two ways of individually supplying fuel to the cylinders. The first being the type where the fuel is actually injected directly into the cylinder and therein mixed with air as is the case with diesel engines, and the other where the fuel is mixed with air just in advance of its entry into the cylinder. The present system is of the latter type. One of the outstanding advantages of individually injecting fuel into the cylinders of an engine is the ability to accurately meter the quantity of fuel to the needs of the engine resulting in a more economical use of fuel. The means whereby such fuel is metered to the cylinders of the engine is the general subject of the present invention.

In the present instance the fuel supplied to the engine's cylinders is metered in accordance with the quantity of air flowing through the air induction system which has been found to be an accurate measure, at least under normal operating conditions, of the quantity of fuel required to provide a satisfactory combustible mixture. The present type fuel injection system may be characterized as being of the mass air flow type to distinguish it from other systems such as those of the speed-density type.

While the concept of precisely metering fuel in accordance with the mass of air flowing through the induction system is essentially a simple one, the devices utilized in achieving this type of control must be able to compensate for many transient operating conditions such as changes between low and high air flow conditions, changes in temperature and sudden demands for power. The present invention relates to a system in which these basic conditions, and others, are accommodated.

In a mass air flow type system an induction passage having venturi means is generally utilized to provide a metering or control signal which is proportional to air flow. A venturi imposes certain inherent limitations either on itself or on the fuel system with which it is employed. A venturi which is small enough to provide a strong metering signal under low air flow conditions is usually too small to pass the requisite amount of air for normal or high power operation. A single fixed size venturi cannot efficiently satisfy both low and high air flow requirements. The present device approaches a solution to this problem by utilizing a pair of different sized parallel related venturis, the smaller one of which is utilized during low air flow conditions and the larger of which is combined therewith during high air flow conditions. In this way a strong metering signal and an adequate quantity of air are insured under all operating conditions.

This invention also provides means in addition to the multiple venturis for insuring an adequate quantity of fuel will be supplied under conditions of sudden power demand which at least momentarily reduces the metering control force to a point where supplementing means is desirable to preserve engine performance. To this end the present device provides an engine load responsive device including a manifold vacuum controlled means adapted, upon the sudden demand for power, to increase the flow through the metering valve notwithstanding the reduction of the normal metering force which would otherwise result either in a reduction or at least a delay in the increase of fuel flow.

In order to insure the accuracy in the quantity of fuel metered to the cylinders of the engine the present device further provides a mechanism for insuring a contant pressure drop across the fuel metering valve under all operating conditions. In this way the metering control system is relatively immune to indiscriminate forces, such as fluctuations in manifold depression, which otherwise would superimpose inaccurate control forces on the system. Further, the pressure drop controlling device is made responsive to engine temperature and load conditions to insure satisfactory operation of the system when the engine is cold as well as when it is warm.

The details of the present system as well as other objects and advantages thereof are set forth in the description which follows.

The drawing is a diagrammatic representation of the subject fuel metering system.

In the drawing an air induction casing is shown generally at 10 and includes an air passage 12 comprising a pair of parallel related induction passages 14 and 16. The induction passages respectively include throttle valves 18 and 20 disposed therein for controlling the quantity of air flow. Venturis 22 and 24 are formed in the induction passages 14 and 16 anteriorly of the respective throttle valves. Throttle valves 18 and 20 are coupled together through arms 26 and 28 which are articulated to a control rod 30. To insure that the smaller induction passage 14 will be opened to the flow of air in advance of the larger passage 16, a lost motion device is provided which permits throttle 18 to open in advance of the opening of throttle 20. The lost motion device includes a perforate lip 32 formed on throttle arm 28 and through which lip the control rod 30 is adapted to slidably pass. Control rod 30 has a pair of axially spaced collars 34 and 36 which are adapted to engage lip 32 depending on the direction of movement of the control rod. With the throttles closed collar 36 abuttingly engages lip 32 with collar 34 being axially spaced therefrom. As the smaller or primary throttle 18 is opened it is apparent that control rod 30 will slide axially relative to lip 32 until collar 34 engages the lip from which point on the secondary or larger throttle will begin to open. In closing the throttles collar 36 will engage the lip 32 pulling the throttle 20 to a closed position. If it is so desired it is possible to arrange the lengths of arms 26 and 28 such that the rate of opening of the secondary or larger throttle 20 once begun is greater than that of the smaller throttle 18. In this way both throttles may reach the fully opened or closed position at the same time notwithstanding the later actuation of the larger throttle 20.

The air from the induction passages 14 and 16 may flow to a manifold or plenum chamber, not shown, from whence it will be distributed to the individual cylinder intake passages 40. The ends 42 of intake passages 40 terminate adjacent the inlet valve of the associated cylinder.

Fuel is supplied to a nozzle 44 in the intake passage 40 from a metering valve 46 which is supplied through a pressure drop control valve 48. A boost pump 50 draws fuel from a sump or reservoir 52 and delivers the same to the pressure drop control valve 48. Fuel is continuously supplied to nozzle 44 from whence it may flow to the intake passage 40. Preferably, however, nozzle 44 may be provided internally with a reservoir or cavity, not shown, which can store the continuously supplied fuel until the cylinder intake valve opens. In this way better fuel atomization is achieved than would be the case if fuel were permitted to collect in passage 40.

The metering valve 46 includes a casing 54 having an inlet port 56 which is supplied from a conduit 58 and an outlet port 60 supplying fuel to conduit 62 connecting with intake passage 40. Metering valve 46 includes a member 64 slidably disposed within casing 54 and which member includes a pair of axially spaced lands 66 and 68 between which is formed a tapered spindle portion 70. As the member 64 slides axially within the valve casing it is apparent that the quantity of fuel passing therethrough will be metered, the quantity generally increasing as the valve moves toward the right causing the tapered spindle 70 to uncover inlet port 56. The contour of the tapered spindle 70 may be varied to suit the type of operation desired and will be variable in accordance with the operating characteristics of the engine with which the subject system is to be utilized. Additional ports 72 and 74 are formed in casing 54 and communicate with branch conduits 76 and 78 supplying fuel to the lands 66 and 68 to continuously flowing small quantities of fuel between the sliding member 64 and the casing 54 to flush out impurities that might otherwise lodge between the sliding member and the casing and interfere with the metering function of valve 46.

Sliding member 64 of valve 46 includes a rod portion 80 projecting axially therefrom and to which a control rod 82 is suitably articulated. A control arm 84 is articulated to the control rod 82 intermediate its ends. Control arm 84 is actuated by a pair of servo members 86 and 88 within which are respectively disposed diaphragm members 90 and 92 and to which members the control arm is connected at its respective ends. The servo members include spring members 94 and 96 respectively disposed therein and biasing against the diaphragms 90 and 92 so as to balance each other through arm 84. Servo 86 includes a chamber 98 within which the spring 96 is disposed and to which chamber a conduit 100 is connected.

An annular groove or chamber 102 is formed in the air intake casing 10 and communicates at its inner end with the venturis 22 and 24 so that the air flow through the venturis creates a vacuum force therein which is proportional to the mass of such air. A port 104 is formed in the casing 10 and communicates with conduit 100 so that the servo chamber 98 is subjected to the vacuum force in annular chamber 102. As the vacuum force in chamber 102 increases with air flow the diaphragm 92 and control arm 84 will be shifted to the right pivoting the control rod 82 about fulcrum point 105 and in turn shifting the sliding member 64 to the right to increase the quantity of fuel flowing through the metering valve 46.

Servo 88 includes a chamber 106 within which spring member 94 is disposed and which chamber is communicated by a conduit 108 to air induction passage 12 anteriorly of the venturis 22 and 24 so that the chamber is maintained substantially at atmospheric pressure, ignoring for practical purposes any rather minor pressure drop through the air cleaner. The inner chambers 110 and 112 of the servos 86 and 88 are opened to atmosphere. While a pair of servo members 86 and 88 have been employed for illustrative purposes, it is apparent that a single servo might be equally well employed and which servo would include a chamber communicating at one side with the venturis and at the other side to atmospheric pressure as already described.

While the fulcrum point 105 of control rod 82 is under normal operating conditions fixed, means is provided for shifting such point under conditions when the normal metering force is inadequate to supply the requisite amount of fuel through the metering valve. Such a condition may occur when the throttles 18 and 20 are suddenly opened in response to an operator demand for increased power. Under these conditions the air flow through the induction passages 14 and 16 does not increase rapidly enough to increase the vacuum force in conduit 100 to supply the amount of fuel needed for the increased power. As a matter of fact, it is possible that the vacuum force in conduit 100 may momentarily drop further exaggerating the insufficiency of fuel flow through the metering valve.

To avoid the fuel starvation just described, a power boost device 111 is provided and includes a servo 113 having a diaphragm 114 therein. Diaphragm 114 with the servo casing defines a chamber 116 to which manifold vacuum is communicated by a conduit 118, the other end of which communicates with a port 120 formed in casing 10 posteriorly of throttle 20. A control rod 122 is centrally secured at one end to the diaphragm 114 and also articulated to the control rod 82 at the aforenoted fulcrum point 105. A spring member 124 is seated within the servo casing and biases against the diaphragm 114 urging the latter in a direction tending to open or increase the flow through the metering valve 46. However, under normal operating conditions the manifold vacuum in conduit 118 is sufficient to overcome spring 124 and retain the diaphragm and control rod 122 in a neutral position. Upon the sudden opening of the throttles the manifold vacuum in conduit 118 will temporarily be reduced to a point where spring 124 will urge the diaphragm 114 and rod 122 to the left causing control rod 82 to move the slidable member 64 of the metering valve to the right increasing the quantity of fuel delivered to intake passages 40 by the valve. When the control rod 82 is so actuated by the spring 124 the pivotal connection 126 between the control arm 84 and control rod 82 momentarily becomes the fulcrum point of the lever system.

An adjusting screw 128 is mounted in the casing 130 and is adapted to be engaged by the end 132 of control rod 122 for regulating the normal operating position of metering valve 46.

To insure that the quantity of fuel flowing through the metering valve 46 is determined solely by the mass of air flowing through the induction passage, as described, it is necessary to provide means whereby the pressure drop across the metering valve is constant under any given set of operating conditions. To this end the pressure drop controlling valve 48 is provided. Valve 48 includes a spindle type member 134 slidably disposed within a casing 136 such that a conduit 138 delivering fuel from boost pump 50 communicates with the reduced portion 140 of the member 134 intermediate its lands 142 and 144. The valve casing includes an outlet port 146 to which the metering valve supply conduit 58 is connected and with which port land 142 cooperates to meter the quantity of fuel supplied to the metering valve in accordance with certain pressure conditions within the system. As was provided in the metering valve, valve 48 is also supplied with fuel through branch passages 146 and 148 for the purpose of insuring that the sliding member 134 is not clogged by impurities.

Spindle member 134 includes a rod 150 projecting axially therefrom and to which a control rod 152 is suitably articulated. A control arm 154 is in turn articulated to the control rod 152 intermediate its ends. The control arm is actuated by the pressure differentials within a pair of servo members 160 and 162. The servos 160 and 162 respectively include diaphragms 164 and 166 to which the control arm is connected at its respective ends. The servo diaphragms 164 and 166 define chambers 168 and 170 with their respective casings. Springs 172 and 174 are respectively disposed in chambers 168 and 170 and are arranged to position the valve member 134 in a given position with respect to output port 146. Chamber 168 of servo 160 is communicated by a branch 176 of conduit 58 with the fuel pressure on the inlet side of the metering valve 46. Servo chamber 170, on the other hand, is communicated by a branch 178 of conduit 62 with fuel pressure on the outlet side of the metering valve 46. Thus the basic pressure drop across valve 46 is determined by the relationship between the springs 172 and 174 of servos 160 and 162 which determine the position of valve member 134. Any tendency to change the pressure drop across the metering valve will be compensated for by the servos 160 and 162. To illustrate, if the fuel pressure on the output side of the metering valve 46 is for some reason decreased a corresponding pressure decrease will take place in chamber 170 and the pressure in chamber 168 of servo 160 will shift the control rod 152 about its fulcrum point 180 to move spindle valve member 134 to the right thereby decreasing the fuel pressure on the inlet side of the metering valve and thereby maintaining the constant pressure drop across the metering valve.

While a fixed pressure drop across the metering valve 46 is normally desired, it may be advantageous to vary the pressure drop in accordance with other operating conditions of the engine. To this end, a cam member 184 associated with spring 174 of servo 162 in such a way that by rotating the cam the rate of spring 174 may be changed which also changes the pressure drop across valve 46. This variation in pressure drop may reflect operator demand which is achieved by connecting the cam 184 to the throttle actuating mechanism through a suitable link member 186. Link 186 might then appropriately be articulated between an arm 188 on cam 184 and the arm 28 connected to throttle valve 20. Depending on the operating characteristic desired, the rate of spring 174 may be varied in accordance with the position of the throttles. Generally, the cam would be arranged as shown with the high point of the cam engaging the cam retaining washer 190 when the throttles are closed to provide a rich fuel-air mixture. As the throttles are opened cam 184 is rotated bringing a lower point on the cam surface in engagement with the spring washer thereby reducing the rate of spring 174 which tends to shift the pressure drop control valve member 134 to the right reducing the fuel flow through valve 48 and thereby providing a leaner fuel-air mixture which is adequate under normal running conditions.

A screw 194 is mounted in casing 130 and is operatively connected to control rod 152 through a rod 214. By adjusting screw 194 pivot point 180 may be shifted to regulate the initial warm running setting of the land 142 of the slidable member 134 with respect to port 146.

To provide good cold starting and running operation an enrichment device indicated generally at 200 is provided and in general functions to enrich the fuel-air mixture when the engine is cold in a manner similar to the operation of automatic chokes. However, it will be apparent that in this instance there is actually no choke valve and that the fuel-air mixture is enriched by supplying additional fuel rather than by reducing the quantity of air which latter means is that usually utilized with an automatic choke. The enrichment device 200 includes a casing 202 upon which is mounted one end 204 of a thermostatic element 206, the other end 208 of which is connected intermediate the ends of a floating lever 210. One end 212 of the floating lever 210 is articulated to a rod 214, the other end of which is pivotally connected to the control rod 152. Casing 202 has a bore 216 formed therein for slidably receiving a piston element 218. A chamber 220 also formed in casing 202 communicates with bore 216 through a port 222. Chamber 220 is adapted to be communicated with manifold vacuum through a suitable conduit 224. Slidable piston element 218 is articulated to the other end 226 of floating lever 210 through a link 228. A spring 230 is disposed within bore 216 and biases the piston element in a direction tending to cause the rightward movement of rod 214 and clockwise rotation of control rod 152 causing pressure drop control valve land 142 to uncover the port 146 to admit more fuel to the metering supply passage 58. As the engine warms, thermostatic element 206 expands shifting the floating lever 210 to the left causing a closing of the port 146 in valve 48. Manifold vacuum also acts on piston element 218 against the force of spring 230 and tends to move the element to the right to also reduce the opening of the fuel supply port 146 in valve 48.

A port 232 is formed in the casing 202 and communicates through conduit means, not shown, with a heat stove mounted on the manifold. An additional passage 234 is formed in casing 202 and communicates the thermostatic chamber 236 with the manifold chamber 220. Heated air is thus drawn through chamber 236 making the thermostatic element closely responsive to the heat of the engine. With mechanism 200 the quantity of fuel supplied from the pressure drop control valve 48 to the metering valve 46 will be increased when the engine is cold and decreased as the engine warms.

To adjust the operation of the enrichment mechanism 200 an adjustable screw member 240 is provided on casing 202. Screw 240 determines the minimum opening of the pressure drop control valve 48 with respect to fuel outlet port 146. Screw 240 is adapted to be engaged by floating lever 210 to determine the maximum warm running position of the lever as determined by the thermostatic element 206. With the engine cold, thermostat 206 will contract moving fulcrum point 180 to the right thereby increasing the opening of port 146 to a maximum. As the engine warms the combined effect of manifold vacuum acting on piston 218 and thermostat 206 will move the fulcrum point to the left reducing the fuel flow through valve 48.

I claim:

1. A fuel injection system for an internal combustion engine comprising an air intake including a pair of parallel related passages, a throttle valve in each of said passages, a venturi formed in each passage anteriorly of the throttle valve, means for sequentially operating said throttle valves whereby one of said passages only will supply air under low engine operating speeds and both passages will supply air as engine speeds increase, an intake passage communicating each cylinder of said engine with the air induction passages, a source of fuel under pressure, conduit means for connecting said fuel source with each cylinder intake passage whereby fuel will be individually supplied to the cylinders of the engine, a metering valve disposed in said conduit means for controlling the quantity of fuel flowing to the cylinders of said engine, a servo mechanism operatively connected to the metering valve, and conduit means connecting said servo mechanism with said venturis whereby the quantity of fuel flowing to the cylinders of the engine is proportional to the mass of air flowing through the air intake passage.

2. A fuel injection system for an internal combustion engine comprising an air intake including a pair of parallel related passages, a throttle valve in each of said passages, a venturi formed in each passage anteriorly of the throttle valve, one of said passages being larger than the other, means for sequentially operating said throttle valves whereby only the smaller induction passage will supply air under low engine operating speeds while both passages will supply air as engine speeds increase, an intake passage communicating each of the cylinders of said engine with the air induction passage, a source of fuel under pressure, conduit means for connecting said fuel source with the intake passage means whereby fuel will be individually supplied to the cylinders of the engine, a metering valve disposed in said conduit means for controlling the quantity of fuel flowing to the cylinders of said engine, a servo mechanism operatively connected to the metering valve, and conduit means connecting said servo mechanism with said venturis whereby the quantity of fuel flowing to the cylinders of the engine is proportional to the mass of air flowing through the air intake passage.

3. A fuel injection system for an internal combustion engine comprising an air intake including a plurality of induction passages, a venturi formed in each passage, a chamber in the air intake communicating said venturis, throttle means for controlling the quantity of air flowing through the induction passages, said throttle means being adapted to progressively increase the flow through the venturi to insure a strong vacuum force in the chamber under all air flow conditions, an intake passage communicating each of the cylinders of said engine with the air induction passage, a source of fuel under pressure, conduit means for connecting said fuel source with the intake passage for individually supplying fuel to the cylinders of the engine, a metering valve disposed in said conduit means for controlling the quantity of fuel flowing to the cylinders of said engine, a servo mechanism operatively connected to the metering valve, and conduit means connecting said servo mechanism with said vacuum chamber for controlling the quantity of fuel flowing to the cylinders of the engine in proportion to the mass of air flowing through the air intake passage.

4. A fuel injection system as defined in claim 3 in which said throttle means comprises a throttle blade in each passage posteriorly of the venturi and a control linkage interconnecting the throttle blades for progressive operation.

5. A fuel injection system for an internal combustion engine comprising an induction passage for supplying air to the cylinders of the engine, throttle valve means in said intake passage for controlling the quantity of air flow, venturi means in said intake passage anteriorly of the throttle valve, a source of fuel under pressure, conduit means communicating said pressure source with the individual cylinders of the engine, a metering valve in said conduit means for controlling the quantity of fuel supplied to said cylinders, a servo mechanism operatively connected to said metering valve, and conduit means connecting said servo means with said venturi for controlling the metering valve in response to the mass of air flowing through the venturi, said servo means including diaphragm means, linkage means operatively connecting the metering valve and diaphragm means, and means for changing the mechanical advantage of the linkage means in response to variations in the load on the engine.

6. A fuel injection system for an internal combustion engine comprising an induction passage for supplying air to the cylinders of the engine, throttle valve means in said intake passage for controlling the quantity of air flow, venturi means in said intake passage anteriorly of the throttle valve, a source of fuel under pressure, conduit means communicating said pressure source with the individual cylinders of the engine, a metering valve in said conduit means for controlling the quantity of fuel supplied to said cylinders, a servo mechanism operatively connected to said metering valve, and conduit means connecting said servo means with said venturi for controlling the metering valve in response to the mass of air flowing through the venturi, said servo means including diaphragm means, a lever for actuating the metering valve, a link articulated to the diaphragm and lever, a fulcrum about which said lever may pivot under the actuation of said diaphragm, and means for shifting said fulcrum in response to variations in the load on the engine.

7. A fuel injection system for an internal combustion engine comprising an induction passage for supplying air to the cylinders of the engine, throttle valve means in said intake passage for controlling the quantity of air flow, venturi means in said intake passage anteriorly of the throttle valve, a source of fuel under pressure, conduit means communicating said pressure source with the individual cylinders of the engine, a metering valve in said conduit means for controlling the quantity of fuel supplied to said cylinders, a servo mechanism operatively connected to said metering valve, and conduit means connecting said servo means with said venturi for controlling the metering valve in response to the mass of air flowing through the venturi, said servo means including diaphragm means, a control rod articulated at one end to the metering valve, a link pivotally connecting said diaphragm and control rod, a fulcrum about which said rod may pivot under the actuation of said diaphragm, and means for shifting said fulcrum in response to variations in the load on the engine.

8. A fuel injection system for an internal combustion engine comprising an air intake having a plurality of induction passages, a chamber in the air intake communicating said venturis, throttle means for controlling the quantity of air flowing through the induction passages, said throttle means being adapted to progressively increase the flow through the induction passage to insure a strong vacuum force in the chamber under all air flow conditions, an intake passage communicating each cylinder of said engine with the air induction passage, a source of fuel under pressure, conduit means for connecting said fuel source with each cylinder intake passage for individually supplying fuel to the cylinders, a metering valve disposed in said conduit means for controlling the quantity of fuel flowing to the cylinders, a servo mechanism operatively connected to the metering valve, and conduit means connecting said servo mechanism with said venturis whereby the quantity of fuel flowing to the cylinders of the engine is proportional to the mass of air flowing through the air intake passage, and control means for maintaining a constant pressure drop across the metering valve.

9. A fuel injection system as described in claim 8 in which said pressure drop control means comprises a valve disposed in the fuel supply conduit means, a servo mechanism operatively connected to said valve, and conduit means respectively communicating said servo mechanism with the fuel under pressure on the inlet and outlet sides of said metering valve.

10. A fuel injection system for an internal combustion engine comprising an air intake having a pair of parallel related passages, a throttle valve in each of said passages, a venturi formed in each passage anteriorly of the throttle valve, means for sequentially operating said throttle valves whereby one of said passages only will supply air under low engine operating speeds and both passages will supply air as engine speeds increase, an intake passage communicating each cylinder of said engine with the air induction passage, a source of fuel under pressure, conduit means for connecting said fuel source with the intake passage means for individually supplying fuel to the cylinders, a metering valve disposed in said conduit means for controlling the quantity of fuel flowing to the cylinders, a servo mechanism operatively connected to the metering valve, and conduit means connecting said servo mechanism with said venturis whereby the quantity of fuel flowing to the cylinders of the engine is proportional to the mass of air flowing through the air intake passage, and control means for maintaining a constant pressure drop across the metering valve.

11. A fuel injection system as described in claim 10 in which said pressure drop control means comprises a valve disposed in the fuel supply conduit means, a servo mechanism operatively connected to said valve, and conduit means respectively communicating said servo mechanism with the fuel under pressure on the inlet and outlet sides of said metering valve.

12. A fuel injection system for an internal combustion engine comprising an air intake having a pair of parallel related passages, a throttle valve in each of said passages, a venturi formed in each passage anteriorly of the throttle valve, means for sequentially operating said throttle valves whereby one of said passages only will supply air under low engine operating speeds and both passages will supply air as engine speeds increase, an intake passage communicating each cylinder of said engine with the air induction passage, a source of fuel under pressure, conduit means for connecting said fuel source with the intake passage means for individually supplying fuel to the cylinders, a metering valve disposed in said conduit means for controlling the quantity of fuel flowing to the cylinders of said engine, a servo mechanism operatively connected to the metering valve, and conduit means connecting said servo mechanism with said venturis whereby the quantity of fuel flowing to the cylinders of the engine is proportional to the mass of air flowing through the air intake passage, a second valve in the fuel conduit means intermediate the metering valve and fuel source for controlling the flow of fuel to the latter valve, diaphragm means operatively connected to the second valve and conduit means respectively communicating the opposite sides of the diaphragm means to the inlet and outlet sides of the metering valve whereby the second valve maintains a constant pressure drop across the metering valve.

13. A fuel injection system for an internal combustion engine comprising an air intake having a pair of parallel related passages, a throttle valve in each of said passages, a venturi formed in each passage anteriorly of the throttle valve, means for sequentially operating said throttle valves whereby one of said passages only will supply air under low engine operating speeds and both passages will supply air as engine speeds increase, an intake passage communicating each cylinder of said engine with the air induction passage, a source of fuel under pressure, conduit means for connecting said fuel source with the intake passage means for individually supplying fuel to the cylinders, a metering valve disposed in said conduit means for controlling the quantity of fuel flowing to the cylinders of said engine, a servo mechanism operatively connected to the metering valve, and conduit means connecting said servo mechanism with said venturis whereby the quantity of fuel flowing to the cylinders of the engine is proportional to the mass of air flowing through the air intake passage, a second valve in the fuel conduit means intermediate the metering valve and fuel source for controlling the flow of fuel to the latter valve, diaphragm means operatively connected to the second valve and conduit means respectively communicating the opposite sides of the diaphragm means to the inlet and outlet sides of the metering valve whereby the second valve maintains a constant pressure drop across the metering valve, and engine temperature responsive means for modifying the actuation of the second valve.

14. A fuel injection system for an internal combustion engine comprising an air intake having a pair of parallel related passages, a throttle valve in each of said passages, a venturi in each of said passages anteriorly of the throttle valve, cylinder intake passages respectively communicating the individual cylinders of the engine with said air intake, a source of fuel, conduit means communicating said fuel source with the individual cylinder intake passages, a metering valve in said conduit means, a servo device connected to said metering valve, conduit means connecting the servo device with the venturis for controlling the flow of fuel through the metering valve in accordance with the mass of air flowing through the air intake, the servo device including means for varying the actuation of said device in accordance with the load on the engine, an additional valve in said conduit means, a second servo device operatively connected to the additional valve, and conduits respectively communicating the second servo device with the fuel under pressure on the inlet and outlet sides of said metering valves to maintain a constant pressure drop across the metering valve.

15. A fuel injection system for an internal combustion engine comprising an air intake having a pair of parallel related passages, a throttle valve in each of said passages, a venturi in each of said passages anteriorly of the throttle valve, cylinder intake passages respectively communicating the individual cylinders of the engine with said air intake, a source of fuel, conduit means communicating said fuel source with the individual cylinder intake passages, a metering valve in said conduit means, a servo device connected to said metering valve, conduit means connecting the servo device with the venturis for controlling the flow of fuel through the metering valve in accordance with the mass of air flowing through the air intake, the servo device including means for varying the actuation of said device in accordance with the load on the engine, an additional valve in said conduit means, a second servo device operatively connected to the additional valve, conduits respectively communicating the second servo device with the fuel under pressure on the inlet and outlet sides of said metering valves to maintain a constant pressure drop across the metering valve, and engine temperature responsive means for modifying the actuation of the second valve.

No references cited.